No. 786,461.   PATENTED APR. 4, 1905.
J. W. PAIGE.
CORN HUSKING MACHINE.
APPLICATION FILED JUNE 4, 1904.
2 SHEETS—SHEET 1.
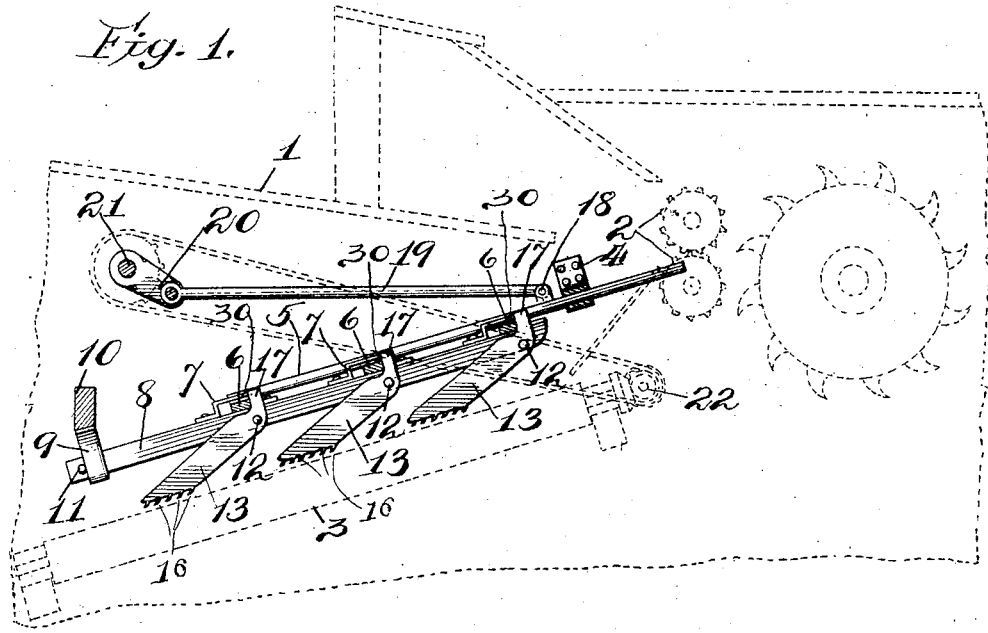
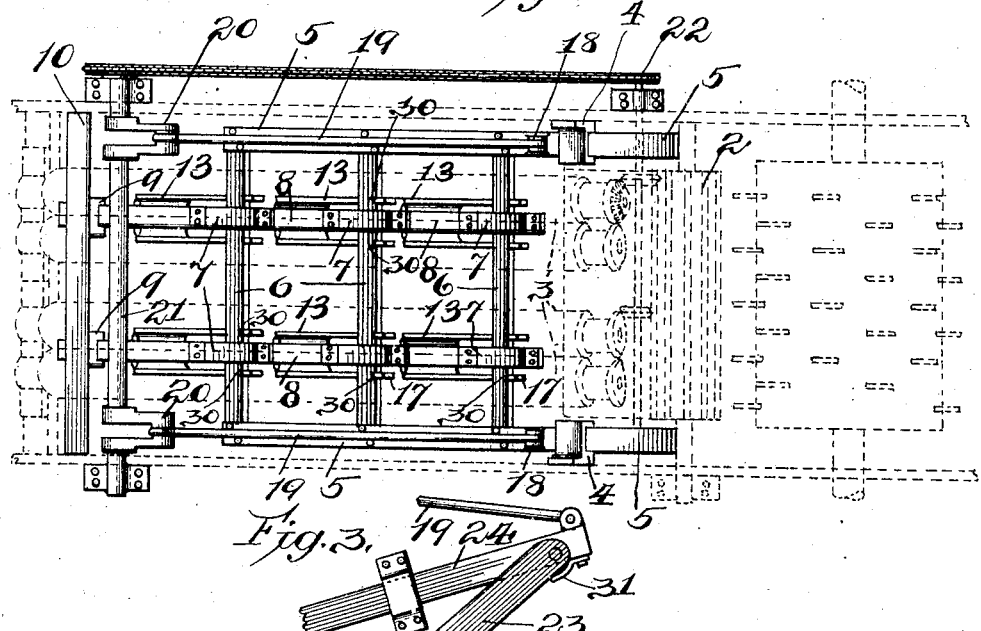
Witnesses:
J B Weir
G. V. Donjarus
Inventor:
James W. Paige
By David H. Fletcher
his Atty.

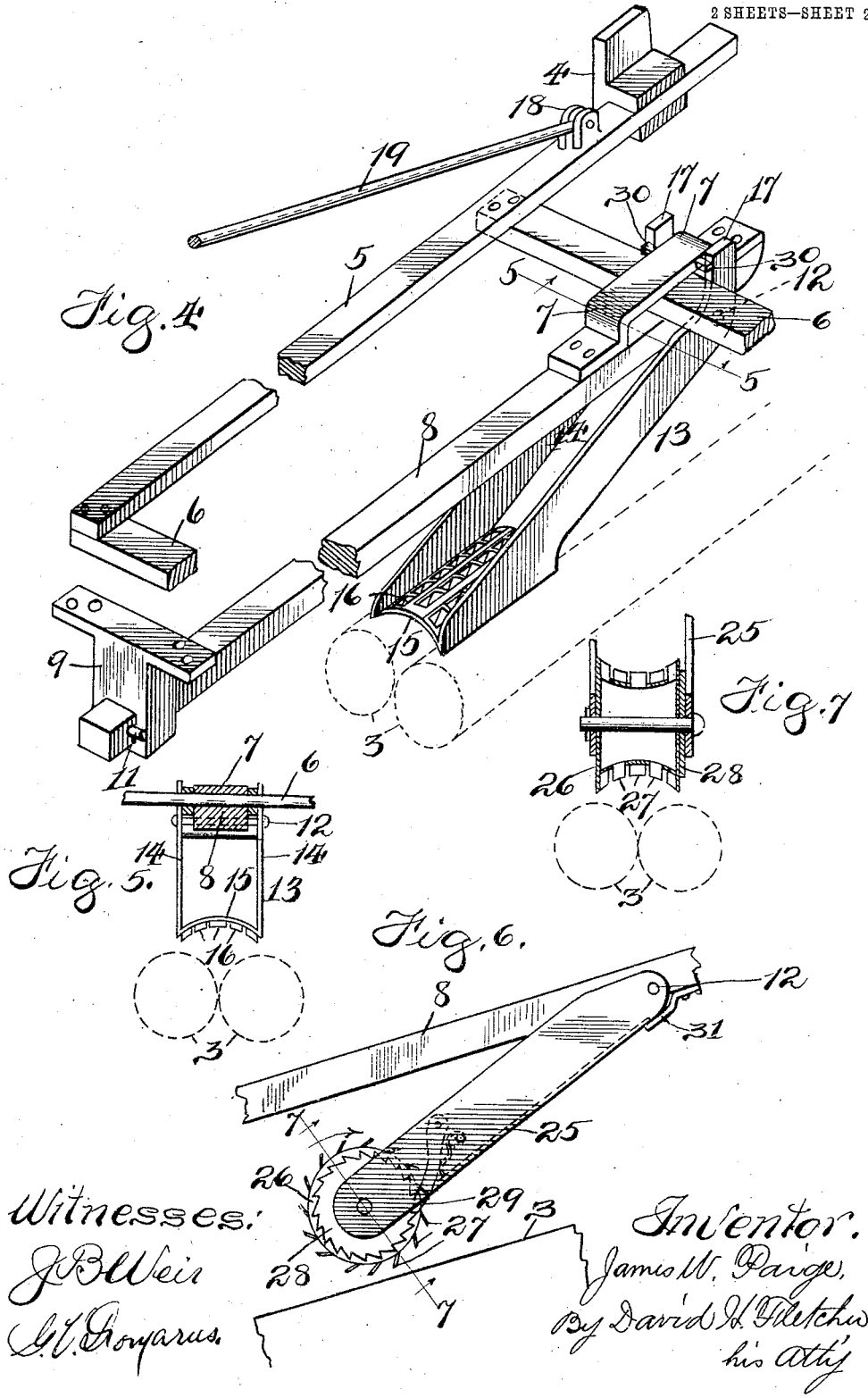

No. 786,461. Patented April 4, 1905.

UNITED STATES PATENT OFFICE.

JAMES W. PAIGE, OF CHICAGO, ILLINOIS, ASSIGNOR TO ALBERT VAN NESS, OF ROCHESTER, INDIANA.

CORN-HUSKING MACHINE.

SPECIFICATION forming part of Letters Patent No. 786,461, dated April 4, 1905.

Application filed June 4, 1904. Serial No. 211,155.

*To all whom it may concern:*

Be it known that I, JAMES W. PAIGE, of Chicago, in the county of Cook and State of Illinois, have invented certain new and useful Improvements in Corn-Husking Machines, of which the following is a description, reference being had to the accompanying drawings, forming a part of this specification, in which corresponding numerals of reference in the different figures indicate like parts.

My invention relates to corn-husking machines; and my object is to provide means in connection with the usual husking-rolls for acting upon and so distributing the corn-ears as they pass downwardly upon said rolls that all the ears may be brought into contact therewith, so that each may be subjected to the action of said rolls.

To these ends my invention consists in the combination of elements hereinafter more specifically described and claimed.

In the drawings, Figure 1 is a side elevation of a portion of a corn-husking machine, showing the features of my invention for controlling the ears of corn in their relation to the husking-rolls, the snapping-rolls, husking-rolls, cylinder, and other features of the machine being shown in dotted lines. Fig. 2 is a plan view thereof. Fig. 3 is a side view of a portion of the vibrating frame, showing a modified form of distributer. Fig. 4 is an enlarged perspective view of a portion of the vibratory frame shown in Figs. 1 and 2 with one of said distributers. Fig. 5 is an end view of one of the pivoted controllers or distributers, the bar of the frame to which it is pivoted being shown in transverse section taken upon the line 5, Fig. 4, viewed in the direction of the arrows there shown. Fig. 6 is a side view of a modified form of distributer; and Fig. 7 is a sectional view taken upon the line 7 7, Fig. 6, viewed in the direction of the arrows there shown.

Referring to the drawings, 1 represents the usual feed-table of the machine, 2 the snapping-rolls, and 3 the husking-rolls, all constructed and arranged in any well-known way.

Bolted or otherwise rigidly attached to the inner faces of the side walls of the machine are guide-brackets 4 4, Figs. 1, 2, and 4, which serve as supports for inclined sliding bars 5 5, loosely fitted therein. Said bars are connected by means of cross-bars 6, the ends of which are rigidly attached thereto. Said cross-bars pass loosely through loops 7, (better shown in Fig. 4,) which are bolted to the upper faces of bars 8, which are parallel to the bars 5. The loops 7 are longer than the width of the bars 6 for the purpose hereinafter stated. The lower ends of the bars 8 are supported in stirrups 9, which are bolted to the bottom of a stationary horizontal cross-bar 10, Figs. 1 and 2, said bars being adapted to slide in said stirrups and to be moved downwardly, as hereinafter stated, but are limited in their upward or backward movement by means of pins 11, which engage said stirrups. It will be seen from the foregoing that the several bars described constitute a two-part frame which is adapted to slide longitudinally and to be supported above and in a plane parallel with that of the husking-rolls.

Pivotally attached at 12 to each of the bars 8 are a series of distributers or gravity presser-feet, (generally designated by 13,) which are preferably formed from sheet metal, having parallel arms 14 adapted to be disposed upon opposite sides of the bars 8, as clearly shown in Figs. 4 and 5. Said arms are connected at their lower ends by means of a web 15, Figs. 4 and 5, which is preferably integral therewith, said web being arched or curved upwardly, as shown, and provided with a series of downwardly-inclined teeth or corrugations 16, formed by cutting or stamping the metal. The bars 8 are located above and in the plane of the meeting faces of the husking-rolls, and said presser-feet are preferably of a width corresponding to the distance between the centers of said rolls. I prefer to form lugs or projections 17 upon the upper ends of the arms 14, which are adapted to be engaged by the cross-bars 6 as they are pushed back, thereby serving to slightly lift the free end of said presser-feet in the manner hereinafter described.

Rigidly attached to the bars 5 5 are lugs 18 18, Figs. 1, 2, and 4, which are connected, by means of pitman 19, to cranks 20 upon a shaft 21, which is driven by means of a sprocket wheel and chain connected with the usual shaft 22, which drives the husking-rolls.

The operation of said device is as follows: The two-part frame being reciprocated by means of the pitman, the cross-bars 6 are moved upwardly within the loops 7 until they engage the extensions 17, thereby lifting the presser-feet from the rolls to a slight distance, when the movement is limited by the loops. When this occurs, the bars 8 are moved back until the full stroke of the pitman is completed. The presser-feet are thereby carried over the ears of corn as the latter slide down upon the rolls with only sufficient contact to prevent the ears from bunching and to cause them to be brought into proper contact with the rolls. Upon the reverse movement the teeth or corrugations engage the ears of corn and push them downwardly at the same time that they are being acted upon by the rolls, and in view of the arched shape of said parts the ears are effectually retained in the bight of said rolls.

While I prefer to produce a tilting action upon the presser-feet in their backward movement, I do not wish to be limited to this feature, inasmuch as it may be dispensed with with good results. In Fig. 3 I have shown a modified construction, in which a presser-foot 23 is pivoted to a bar 24 of a vibratory frame. In this construction the inclined presser-foot is drawn back without lifting except as it is raised by contact with the ears of corn over which it is dragged.

In Figs. 6 and 7 a still further modification is shown. Pivoted loosely to the bar 8 is a downwardly-inclined arm 25, having journaled on its lower end a wheel 26, provided with transversely-arranged teeth 27, which are so inclined, as shown with reference to the periphery of said wheel, that those upon its under side will incline forwardly and downwardly. A ratchet 28 is secured to the face of the wheel in position to be engaged by a spring-controlled pawl 29. When the part is moved downwardly, the wheel is prevented from rotation by means of said pawl and ratchet, thereby enabling the teeth to push the ears of corn down. A reverse movement causes the wheel to rotote, thus permitting it to ride over while at the same time exerting a pressure upon the ears of corn.

It is obvious that the number of presser-feet for each pair of rolls, as well as the extent of movement thereof, may be varied; but I prefer the number shown.

Stops of some kind should be employed for preventing the presser-feet from being brought into actual contact with the husking-rolls. This may be accomplished by means of lugs 30 upon the loops 7 (see Fig. 4) to engage the projection 17 or by means of a bent plate 31, Figs. 3 and 6, bolted to the bottom of the bar to which the presser-foot is pivoted.

Having thus described my invention, I claim—

1. The combination with the husking-rolls of a corn-husking machine, of a primary and secondary vibratory framework located above said rolls, means for imparting a vibratory movement directly to said primary framework, means for allowing a play of said primary upon said secondary framework whereby the movement of the latter is less than that of the former, a series of downwardly and forwardly inclined gravity presser-feet pivoted to said secondary framework, and arms or projections extending upwardly therefrom at or near their pivoted points in position to engage said primary framework upon its upward or backward stroke, whereby said feet may be lifted upon said backward stroke and allowed to descend when the movement is reversed.

2. The combination with the husking-rolls of a corn-husking machine, of a vibratory frame arranged above said rolls, means for vibrating the same lengthwise of said rolls, a series of downwardly and forwardly inclined gravity presser-feet having their upper ends pivotally attached to said frame said presser-feet having rollers upon their lower ends, and means for preventing the rotation of the latter upon the downward stroke of said frame.

3. The combination with the husking-rolls of a corn-husking machine, of a vibratory frame arranged above said rolls, means for vibrating the same lengthwise of said rolls, a series of downwardly and forwardly inclined gravity presser-feet having their upper ends pivotally attached to said frame, said presser-feet being provided with rollers at their lower ends and a ratchet and pawl for preventing the movement of said rollers except when the frame is moved upwardly.

In testimony whereof I have signed my name to this specification, in the presence of two subscribing witnesses, this 31st day of May, 1904.

JAMES W. PAIGE.

Witnesses:
   D. H. FLETCHER,
   C. E. JORDAN.